United States Patent
Tamaizumi et al.

(10) Patent No.: US 9,573,616 B2
(45) Date of Patent: Feb. 21, 2017

(54) ELECTRIC POWER STEERING DEVICE

(71) Applicant: JTEKT CORPORATION, Osaka-shi, Osaka (JP)

(72) Inventors: Terutaka Tamaizumi, Okazaki (JP); Hirozumi Eki, Okazaki (JP); Masayuki Kita, Okazaki (JP); Isao Namikawa, Okazaki (JP); Akihiko Nishimura, Okazaki (JP); Jun Hasegawa, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 9 days.

(21) Appl. No.: 14/633,755

(22) Filed: Feb. 27, 2015

(65) Prior Publication Data
US 2015/0251691 A1     Sep. 10, 2015

(30) Foreign Application Priority Data
Mar. 7, 2014 (JP) ................................. 2014-045227

(51) Int. Cl.
*B62D 6/00* (2006.01)
*B63G 8/20* (2006.01)
*B62D 5/04* (2006.01)

(52) U.S. Cl.
CPC ........... *B62D 5/0412* (2013.01); *B62D 5/0472* (2013.01); *B62D 6/008* (2013.01)

(58) Field of Classification Search
CPC ..... B62D 5/0412; B62D 5/0472; B62D 6/008; B62D 5/0463; B62D 6/00; B62D 6/08; B62D 6/10; B62D 5/046
USPC .................................................... 701/41, 42
See application file for complete search history.

(56) References Cited

U.S. PATENT DOCUMENTS

| 6,161,068 A * | 12/2000 | Kurishige | B62D 5/0472 180/400 |
| 6,450,287 B1 * | 9/2002 | Kurishige | B62D 5/0466 180/443 |
| 2003/0055545 A1 * | 3/2003 | Uenuma | B62D 6/008 701/41 |

(Continued)

FOREIGN PATENT DOCUMENTS

| EP | 1 837 266 A1 | 9/2007 |
| JP | 2008-137486 A | 6/2008 |

OTHER PUBLICATIONS

Jul. 14, 2015 extended Search Report issued in European Patent Application No. 15157522.2.

*Primary Examiner* — Khoi Tran
*Assistant Examiner* — Jorge Peche
(74) *Attorney, Agent, or Firm* — Oliff PLC

(57) ABSTRACT

A control device in an electric power steering device calculates a first assist component based on steering torque and a vehicle speed. The control device also calculates a compensation component associated with an reverse input and calculates a steered angle command value based on an addition value of the compensation component and basic drive torque that is an addition value of the steering torque and the first assist component, produces a second assist component by performing steered angle feedback control that causes the steered angle of a vehicle to follow the steered angle command value. The control device controls drive of a motor based on an assist command value that is an addition value of the first assist component and the second assist component.

9 Claims, 8 Drawing Sheets

(56) References Cited

U.S. PATENT DOCUMENTS

| | | | |
|---|---|---|---|
| 2004/0148080 A1* | 7/2004 | Ekmark | B62D 6/008 701/41 |
| 2004/0245041 A1* | 12/2004 | Fukuda | B62D 5/0427 180/444 |
| 2005/0182541 A1* | 8/2005 | Tamaizumi | B62D 5/046 701/41 |
| 2007/0107978 A1* | 5/2007 | Aoki | B62D 5/0472 180/446 |
| 2007/0107979 A1* | 5/2007 | Limpibunterng | B62D 5/008 180/446 |
| 2007/0205041 A1* | 9/2007 | Nishizaki | B62D 6/10 180/446 |
| 2008/0262678 A1* | 10/2008 | Nishimura | B62D 5/0472 701/42 |
| 2009/0000857 A1* | 1/2009 | Sugiyama | B62D 5/0472 180/444 |
| 2009/0192679 A1* | 7/2009 | Kobayashi | B62D 5/0463 701/42 |
| 2009/0224502 A1* | 9/2009 | Yamawaki | B60G 17/06 280/124.108 |
| 2010/0004824 A1* | 1/2010 | Ikeda | B62D 5/0463 701/42 |
| 2010/0168963 A1* | 7/2010 | Yamamoto | B62D 5/0463 701/42 |
| 2010/0217487 A1* | 8/2010 | Murakami | B62D 5/0472 701/42 |
| 2010/0280715 A1* | 11/2010 | Kobayashi | B62D 5/0463 701/41 |
| 2010/0286870 A1* | 11/2010 | Endo | H02P 6/10 701/41 |
| 2010/0292896 A1* | 11/2010 | Watanabe | B62D 5/0466 701/41 |
| 2010/0324785 A1* | 12/2010 | Kurishige | B62D 5/046 701/42 |
| 2012/0061169 A1* | 3/2012 | Oblizajek | B62D 5/0472 180/446 |
| 2012/0197493 A1* | 8/2012 | Fujimoto | B62D 15/024 701/41 |
| 2012/0296525 A1* | 11/2012 | Endo | B62D 5/0466 701/42 |
| 2013/0060427 A1* | 3/2013 | Kataoka | B62D 6/008 701/42 |
| 2013/0124048 A1* | 5/2013 | Gruener | B62D 6/00 701/42 |
| 2013/0211677 A1* | 8/2013 | Oblizajek | B62D 5/046 701/42 |
| 2013/0311044 A1* | 11/2013 | Tamaizumi | B62D 5/0463 701/42 |
| 2014/0058630 A1* | 2/2014 | Kezobo | B62D 5/0463 701/42 |
| 2014/0365077 A1* | 12/2014 | Kariatsumari | B62D 5/0472 701/41 |
| 2015/0019082 A1* | 1/2015 | Inoue | B62D 1/286 701/41 |
| 2015/0120140 A1* | 4/2015 | Kudo | B62D 6/008 701/41 |
| 2015/0175193 A1* | 6/2015 | Endo | B62D 5/0487 701/29.2 |
| 2015/0191200 A1* | 7/2015 | Tsubaki | B62D 15/0285 701/42 |

* cited by examiner

F I G . 5
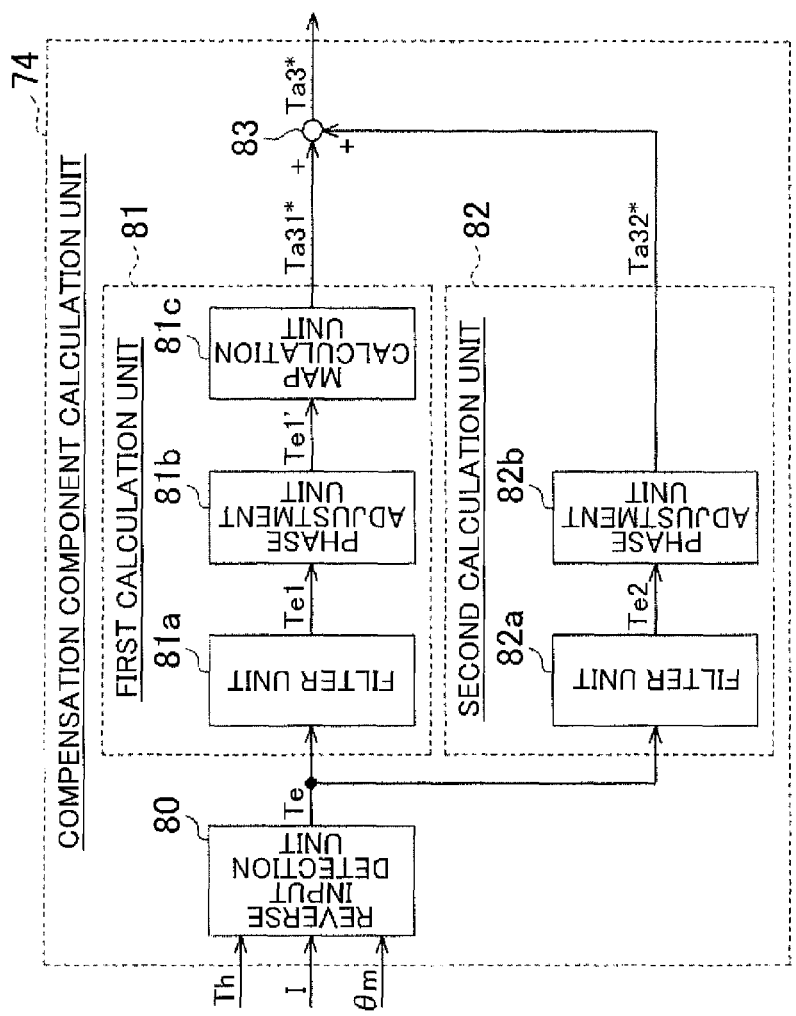

ELECTRIC POWER STEERING DEVICE

INCORPORATION BY REFERENCE

The disclosure of Japanese Patent Application No. 2014-045227 filed on Mar. 7, 2014 including the specification, drawings and abstract, is incorporated herein by reference in its entirety.

BACKGROUND OF THE INVENTION

1. Field of the Invention

The invention relates to an electric power steering device that assists vehicle steering operation.

2. Description of Related Art

Japanese Patent Application Publication No. 2008-137486 (JP 2008-137486 A) describes this kind of electric power steering device. The electric power steering device includes a torque sensor that detects a steering torque applied by a driver to a steering mechanism, and a control device that controls drive of a motor. The control device sets an assist command value based on the steering torque detected by the torque sensor and controls the drive of the motor to cause assist force from the motor to follow the assist command value.

While a vehicle is traveling, a reverse input associated with a road surface reaction force generated depending on a road condition is transmitted from steered wheels of the vehicle to a steering wheel through a steering mechanism. A driver can then obtain information such as a road condition and grip force of the steered wheels while driving the vehicle through the reverse input transmitted to the driver's hands grasping the steering wheel. The reverse input also includes braking vibrations or the like as well as road surface reaction force, which is a factor for poor steering feel. Accordingly, if a required reverse input only is can be transmitted more appropriately, the steering feel can be improved.

SUMMARY OF THE INVENTION

It is one object of the present invention to provide an electric power steering device that provides further improved steering feel.

According to an aspect of the present invention, an electric power steering device includes an assist mechanism that applies assist force from a motor to a steering mechanism of a vehicle, and a control unit that controls drive of the motor based on an assist command value associated with a target value for the assist force.

The control unit includes a basic assist component calculation unit that calculates a first assist component serving as a basic component for the assist force based on steering torque applied by the steering mechanism in response to steering operation of the vehicle, a compensation component calculation unit that calculates a compensation component associated with a reverse input acting on the steering mechanism from steered wheels of the vehicle, and an assist command value calculation unit that calculates the assist command value by compensating the first assist component based on the compensation component. The compensation component calculation unit includes: a reverse input detection unit that detects or estimates the reverse input; a filter unit that extracts a specific frequency component belonging to a certain frequency band from the detected or estimated reverse input; and a phase adjustment unit that adjusts the phase of the specific frequency component extracted by the filter unit, and calculates the compensation component based on the phase-adjusted specific frequency component.

According to this configuration, the assist command value contains the compensation component set based on the phase-adjusted specific frequency component, and therefore the assist force associated with the phase-adjusted specific frequency component is applied to the steering mechanism by the motor. The assist force allows amplifying a required reverse input component, or suppressing an undesirable reverse input component. It is thus possible to transmit only a required reverse input component to the steering mechanism and therefore to improve the steering feel that the driver receives.

It is difficult to amplify or suppressing the reverse input component appropriately simply by setting the compensation component based on an original specific frequency component without phase adjustment for the following reason.

When the compensation component is set by directly using a specific frequency component, there may be a phase shift between the reverse input component at a part of the steering mechanism where the assist force associated with the compensation component is applied and the assist force associated with the compensation component. This is because the phase of the assist force associated with the compensation component is delayed with respect to the phase of the reverse input component due to, for example, the structure of the transmission mechanism that transmits the assist force from the motor to the steering mechanism, or delay of calculation by the control unit. If such a phase shift is present, there will be a phase shift between the actual reverse input vibrations generated in the steering mechanism and the assist force associated with the compensation component, and consequently amplifying or suppressing the reverse input component cannot be performed appropriately.

In this respect, according to the above configuration, the compensation component calculation unit adjusts the phase of the specific frequency component and calculates the compensation component based on the phase-adjusted specific frequency component. In this manner, the phase of the compensation component can be set as desirable for amplifying or suppressing the reverse input component. It is thus possible to amplify or suppress the reverse input component more precisely and therefore to provide the driver with further improved steering feel.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 5 is a control block diagram of a compensation component calculation unit in the control device according to the first embodiment;

DETAILED DESCRIPTION OF EMBODIMENTS

The following describes a first embodiment of an electric power steering device according to the present invention.

Figure 1:
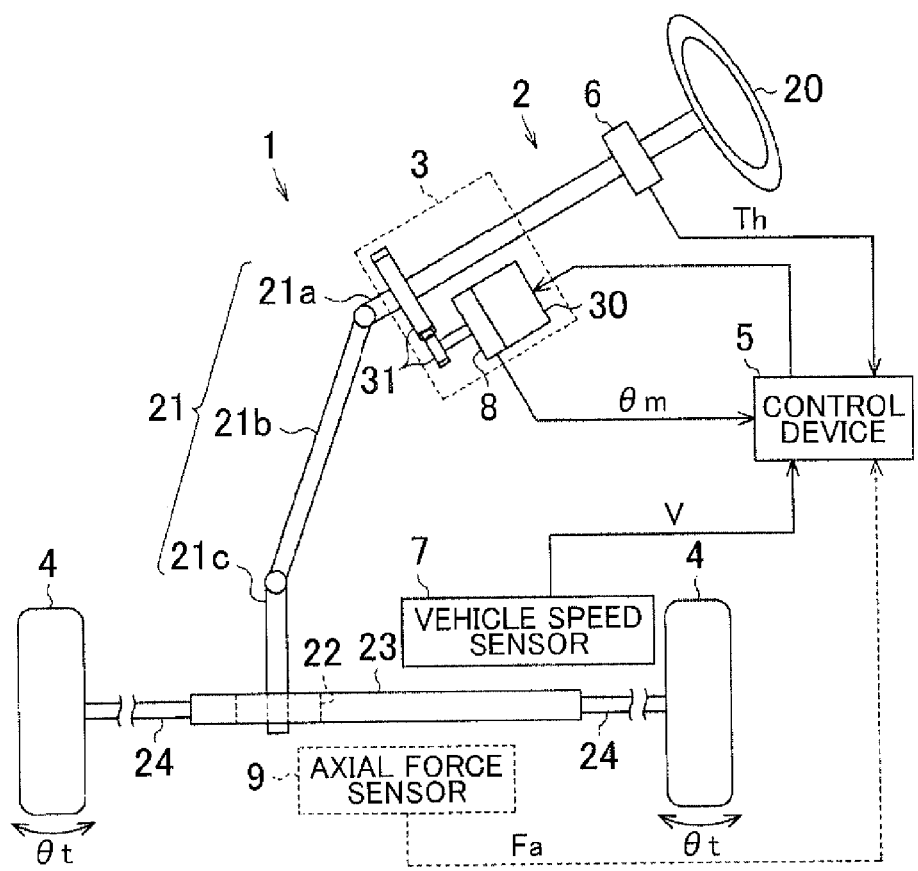
FIG. 1 is a block diagram showing the schematic configuration of an electric power steering device according to a first embodiment.

As shown in FIG. 1, an electric power steering device 1 includes a steering mechanism 2 that turns steered wheels 4 in accordance with the operation of a steering wheel 20 performed by a driver, and an assist mechanism 3 that assists the driver's steering operation.

The steering mechanism 2 includes a steering shaft 21 serving as an axis of rotation for the steering wheel 20. The steering shaft 21 includes a column shaft 21a connected to the steering wheel 20, an intermediate shaft 21b connected to the lower end of the column shaft 21a, and a pinion shaft 21c connected to the lower end of the intermediate shaft 21b. The lower end of the pinion shaft 21c is connected to a rack shaft 23 through a rack and pinion mechanism 22. In the steering mechanism 2, when the steering shaft 21 rotates in response to the driver's steering operation, the rotation of the steering shaft 21 is converted into linear reciprocating movement in the axial direction of the rack shaft 23 through the rack and pinion mechanism 22. As this linear reciprocating movement of the rack shaft 23 is transmitted to the steered wheels 4 via tie-rods 24 connected to both ends the rack shaft 23, the steered angle θt of the steered wheels 4 is changed and the traveling direction of the vehicle is changed.

The assist mechanism 3 includes a motor 30 that provides the column shaft 21a with assist torque. The motor 30 in the first embodiment is a brushless motor. As the rotation of the motor 30 is transmitted to the column shaft 21a via a speed reducer 31, the motor torque is applied to the steering shaft. 21 to assist the steering operation.

The electric power steering device 1 is provided with various sensors that detect an operation amount of the steering wheel 20 and state quantities of the vehicle. The steering shaft 21, for example, is provided with a torque sensor 6 that detects a steering torque Th applied to the steering shaft 21 by the driver's steering operation. In the vehicle, a vehicle speed sensor 7 that detects a vehicle speed V is provided. The motor 30 is provided with a rotation angle sensor 8 that detects a rotation angle θm. Outputs from these sensors are received by the control device 5. The control device 5 is an example of a control unit that controls the drive of the motor 30 based on the outputs from the sensors 6 to 8.

Figure 2:
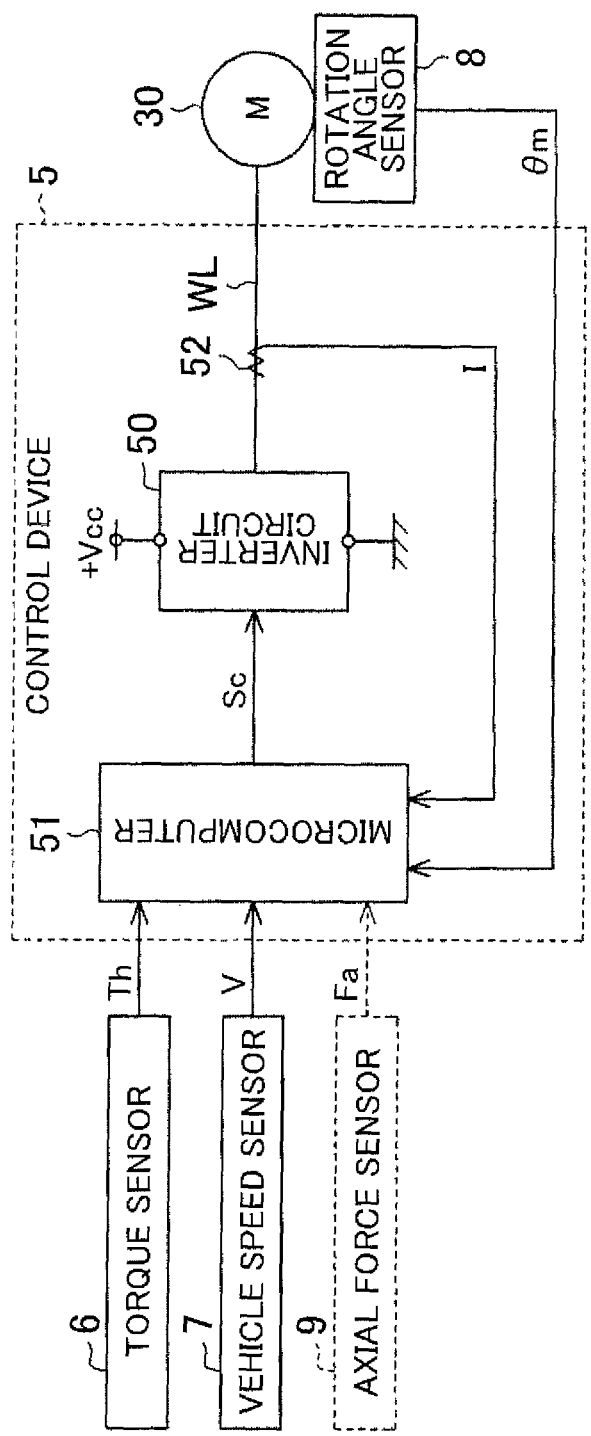
FIG. 2 is a block diagram showing the configuration of a control device of the electric power steering device according to the first embodiment.

As shown in FIG. 2, the control device 5 includes an inverter circuit 50 that converts a direct current supplied by a power supply (power supply voltage +Vcc) such as an in-vehicle battery into a three-phase (U-phase, V-phase, W-phase) alternating current, and a microcomputer 51 that drives the inverter circuit 50 with pulse width modulation (PWM).

The inverter circuit 50 generates a three-phase alternating current based on a control signal (PWM drive signal) Sc from the microcomputer 51. The motor 30 is supplied with this three-phase alternate current via feeders WL. The feeders WL are provided with current sensors 52 that detect current values I of the respective phases supplied to the motor 30. For convenience, in FIG. 2, the feeders WL for respective phases are collectively illustrated as one feeder WL and the current sensors 52 for respective phases are collectively illustrated as one current sensor 52. The output from the current sensor 52 is received by the microcomputer 51.

The microcomputer 51 also receives outputs from the torque sensor 6, the vehicle speed sensor 7 and the rotation angle sensor 8. The microcomputer 51 generates the control signal Sc based on the steering torque Th, the vehicle speed V, the motor rotation angle θm that are detected by the sensors 6 to 8 and 52 and phase current values I. The microcomputer 51 outputs this control signal Sc to the inverter circuit 50 to drive the inverter circuit 50 with PWM and control the drive of the motor 30.

The following describes drive control on the motor 30 by the microcomputer 51.

Figure 3:
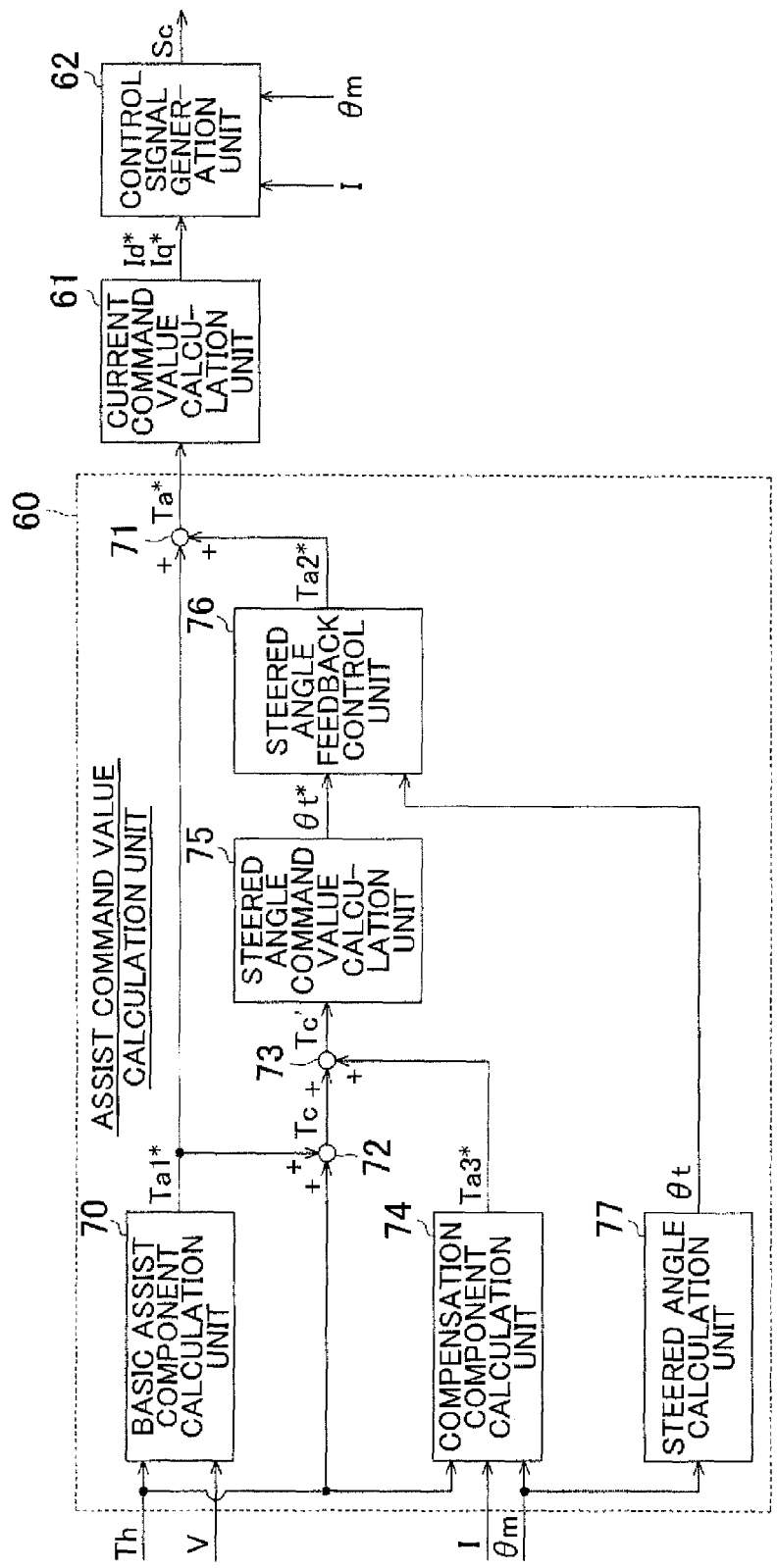
FIG. 3 is a control block diagram of the control device according to the first embodiment.

As shown in FIG. 3, the microcomputer 51 includes an assist command value calculation unit 60 that calculates an assist command value Ta* based on the steering torque Th, the vehicle speed V, each of the phase current values I, and the motor rotation angle θm. The assist command value Ta* is associated with the target value of the assist torque applied to the steering shaft 21 from the motor 30. The microcomputer 51 includes a current command value calculation unit 61 that calculates current command values Id* and Iq* based on the assist command Ta*, and a control signal generation unit 62 that generates the control signal Sc based on the current command values Id*, Iq*, and other parameters. The current command values Id* and Iq* are associated with a target value of a current applied to the motor 30, more specifically, a current value on the axis d and a current value on the axis q, respectively, in a d/q coordinate system.

Figure 4:
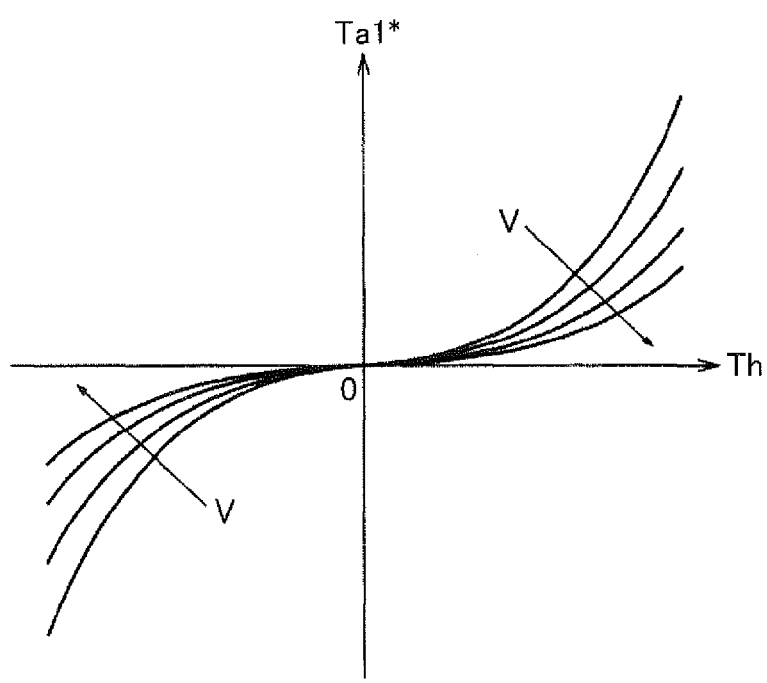
FIG. 4 is a graph showing an example of a map indicating a relation between steering torque Th and a first assist component Ta1*.

The assist command value calculation unit 60 includes a basic assist component calculation unit 70 that calculates a first assist component Ta1* based on the steering torque Th and the vehicle speed V. The first assist component Ta1* is a basic component of an assist command value Ta*. The basic assist component calculation unit 70 has a map as shown in FIG. 4 as an example. Using this map, the basic assist component calculation unit 70 sets a larger absolute value of the first assist component Ta1* as the absolute value of the steering torque Th becomes larger and the absolute value of the vehicle speed V becomes smaller. As shown in FIG. 3, the basic assist component calculation unit 70 outputs the calculated first assist component Ta1* to an adder 71 and an adder 72. The adder 72 calculates basic drive torque Tc (=Ta1*+Th) by adding the steering torque Th to the first assist component Ta1* calculated by the assist command value calculation unit 60 and outputs the calculated basic drive torque Tc to an adder 73.

The assist command value calculation unit 60 includes a compensation component calculation unit 74 that calculates a compensation component Ta3* associated with the reverse input based on the steering torque Th, each of the phase current values I and the motor rotation angle θm. The compensation component calculation unit 74 outputs the calculated compensation component Ta3* to the adder 73. The adder 73 corrects the basic drive torque Tc by adding the compensation component Ta3* to the basic drive torque Tc and outputs the corrected basic drive torque Tc'(=Tc+Ta3*) to a steered angle command value calculation unit 75.

The steered angle command value calculation unit 75 calculates a steered angle command value θt* from the corrected basic drive torque Tc', based on an ideal model. The steered angle command value θt* is associated with the target value of the actual steered angle θt. The ideal model is a modeled measurement result that is obtained by measuring an ideal steered angle θt according to the basic drive torque Tc in experiments or other means. The steered angle command value calculation unit 75 outputs the steered angle command value θt* calculated based on the ideal model to a steered angle feedback control unit 76.

The assist command value calculation unit 60 includes a steered angle calculation unit 77 that calculates an actual steered angle θt based on the motor rotation angle θm. As shown in FIG. 1, the motor 30 is connected to the steering shaft 21 via the speed reducer 31. Therefore there is a correlation between the motor rotation angle θm and the rotation angle of the steering shaft 21. That is, there is also a correlation between the motor rotation angle θm and the steered angle θt. The steered angle calculation unit 77 shown in FIG. 3 uses such correlations to calculate the steered angle θt from the motor rotation angle θm and outputs the calculated steered angle θt to the steered angle feedback control unit 76.

To cause the steered angle θt to follow the steered angle command value θt*, the steered angle feedback control unit 76 executes feedback control based on the deviation therebetween to calculate the second assist component Ta2*. The steered angle feedback control unit 76 outputs the calculated second assist component Ta2* to the adder 71. The adder 71 adds the first assist component Ta1* calculated by the basic assist component calculation unit 70 to the second assist component Ta2* calculated by the steered angle feedback control unit 76 to obtain an assist command value Ta*+Ta2*). The assist command value calculation unit 60 outputs the assist command value Ta* calculated by the adder 71 as a calculation result to a current command value calculation unit 61.

The current command value calculation unit 61 calculates a q-axis current command value Iq* based on the assist command value Ta* and outputs the calculated q-axis current command value Iq* to a control signal generation unit 62. In the first embodiment, the d-axis current command value Id* is set to zero. The current command value calculation unit 61 also outputs the d-axis current command value Id* to the control signal generation unit 62.

The control signal generation unit 62 receives each phase current values I and the motor rotation angle θm, in addition to the d-axis current command value Id* and the q-axis current command value Iq*. The control signal generation unit 62 maps each of the phase current values I to the d/q coordinate system based on the motor rotation θm to calculate the d-axis current value and the q-axis current value that represent the actual current value of the motor 30 in the d/q coordinate system. In order to cause the actual d-axis current value to follow the d-axis current command value Id* and to cause the actual q-axis current value to follow the q-axis current command value Iq*, the control signal generation unit 62 generates the control signal Sc by executing current feedback control based on a deviation between the values for each of the d and q axes. This control signal Sc is output from the microcomputer 51 to the inverter circuit 50, whereby the drive current according to the control signal Sc is supplied to the motor 30. Assist torque according to the assist command value Ta* is applied to from the motor 30 to the steering shaft 21, and assist control is thus executed.

With this configuration, the assist command value Ta* includes the second assist component Ta2* generated by the steered angle feedback control. Therefore when the assist torque based on the assist command Ta* is applied to the steering shaft 21, the steered angle θt is retained at the steered angle command value θt. It is thus possible to reduce the reverse input generated in the steering mechanism 2 due to, for example, road conditions or braking operation. That is, the second assist component Ta2* is adjusted so that the steered angle θt is retained at the steered angle command value θt* even when the reverse input is transmitted from the steered wheels 4 to the steering mechanism 2. Accordingly, steering assist is performed for the steering mechanism 2 in such a direction that the reverse input is cancelled out. Thus, a large part of road information is cancelled out and consequently a problem arises that it is difficult for the driver to obtain sufficient road information.

In the electric power steering device 1, there may be a calculation error in the second assist component Ta2* due to, for example, delay of calculation, noise from sensors. Accordingly, it is difficult to completely cancel out the reverse input transmitted from the steered wheels 4 to the steering mechanism 2, and it is also impossible to completely eliminate reverse input vibrations that cause poor steering feel, such as braking vibrations produced in the steering mechanism 2 when the driver depresses the brake pedal.

In the first embodiment, the compensation component calculation unit 74 calculates the compensation component Ta3* associated with the reverse input. The basic drive torque Te that is input information of the steered angle command value calculation unit 75 is corrected based on the compensation component Ta3*. Therefore, the steered angle command value et* calculated by the steered angle command value calculation unit 75 is changed according to the correction of the basic drive torque Tc based on the compensation component Ta3*. The change of the steered angle command value et*changes the second assist component Tat* calculated by the steered angle feedback control unit 76 and then changes the assist command value Ta* . . . . That is, the assist command value Ta* is changed according to the change of the compensation component Ta3*. Accordingly, the assist torque associated with the compensation component Ta3*is applied to the steering shaft 21. In the first embodiment, this assist torque associated with the compensation component Ta3* allows transmitting the reverse input reflecting a road condition to the steering wheel 20, and suppressing the reverse input that causes poor steering feel. It is thus possible to improve the steering feel that the driver receives. The details will be described as follows.

First, the method for calculating the compensation component Ta3* by the compensation component calculation unit 74 will be described in detail.

As shown in FIG. 5, the compensation component calculation unit 74 includes a reverse input detection unit 80 that calculates an estimation value Te for the reverse input based on the steering torque Th, each of the phase current values I, and the motor rotation angle θm.

The method for calculating the reverse input estimation value Te by the reverse input detection unit 80 is as follows.

In the electric power steering device 1, input torque is calculated by adding up the steering torque Th applied to the steering wheel 20 by the driver and the assist torque Tas applied to the steering shaft 21 by the motor 30. This input torque is equal to an addition value of an actual reverse input Tr and reaction force Tf that acts on the steering mechanism 2 during operation of the electric power steering device 1.

That is, for the electric power steering device 1, formula (1) shown below is established regarding the relation among the steering torque Th, the assist torque Tas, the reaction force Tf, and the actual reverse input Tr.

$$Th+Tas=Tr+Tf \quad (1)$$

When the actual reverse input Tr in formula (1) is replaced by the reverse input estimation value Te, the reverse input estimation value Te can be calculated. That is, the reverse input estimation value Te can be obtained with formula (2) shown below.

$$Te=Th+Tas-Tf \quad (2)$$

The reverse input detection unit 80 calculates the q-axis current value based on each of the phase current values I and the motor rotation angle θm, and multiplies this q-axis current value by the torque constant of the motor 30 to calculate the assist torque Tas. The reverse input detection unit 80 also calculates the angular velocity of the motor 30 based on the change rate per unit time of the motor rotation θm and calculates the reaction force Tf based on the calculated motor angular velocity. More specifically, a large part of the reaction force Tf consists of torque based on the inertia of the motor 30 and frictional torque acting on the steering mechanism 2. The former torque, that is, the motor inertia torque is correlated with the motor angular velocity. The latter torque, that is, the frictional torque is correlated with the angular velocity of the steering shaft 21, in other words, the motor angular velocity. Therefore the reaction force Tf is fundamentally correlated with the motor angular velocity. The reverse input detection unit 80 uses such correlations to calculate the reaction force Tf from the motor angular velocity based on, for example, a map operation. The reverse input detection unit 80 calculates the reverse input estimation value Te with formula (2) based on the steering torque Th detected by the torque sensor 6, a calculated value for the assist torque Tas and a calculated value for the reaction force Tf. The reverse input detection unit 80 outputs the calculated reverse input estimation value Te to a first calculation unit 81 and a second calculation unit 82.

The first calculation unit 81 calculates a first compensation component Ta31* for amplifying a first reverse input component Tr1 included in the reverse input and reflecting a road condition. The second calculation unit 82 calculates a second compensation component Ta32* for reducing a second reverse input component Tr2 included in the reverse input and causing poor steering feel. The compensation component calculation unit 74 calculates the compensation component Ta3* with the adder 83 to add up the first compensation component Ta31* calculated by the rust calculation unit 81 and the second compensation component Ta32* calculated by the second calculation unit 82. That is, assist torque associated with the compensation component Ta3*consists of assist torque associated with the first compensation component Ta31* and assist torque associated with the second compensation component Ta32*.

Next, configurations of the first calculation 81 and the second calculation unit 82 will be described in detail as follows.

The first calculation unit 81 includes a filter unit 81a, a phase adjustment unit 81b and a map calculation unit 81c.

The filter unit 81a extracts, from the reverse input estimation value Te, a first specific frequency component Te1 belonging to a frequency band associated with the first reverse input component Tr1 reflecting a road condition. The frequency band associated with the first reverse input component Tr1 reflecting a road condition is, for example, a frequency band for a case where the surface of a road on which the vehicle is traveling is an asphalt road surface or a frequency band for a case where with the surface of a road on which the vehicle is traveling is a gravel road surface. When the vehicle is, for example, traveling on an asphalt road surface, reverse vibrations with a specific frequency band are produced in the steering mechanism 2. In the first embodiment, frequency bands of the reverse input vibrations when the vehicle is traveling on various road surfaces including an asphalt road surface are assumed to be measured experimentally and the measurement results are used to set the frequency band associated with the first reverse input component Tr1 reflecting a road condition. The filter unit 81a outputs the extracted first specific frequency component Te1 to the phase adjustment unit 81b.

When the first specific frequency component Te1 extracted by the filter unit 81a is directly used as the first compensation component Ta31*, the motor 30 is controlled according to the first specific frequency component Te1, and thus the driver can obtain road information. This method, however, may not properly provide road information to the driver for the following reasons.

Figure 6:
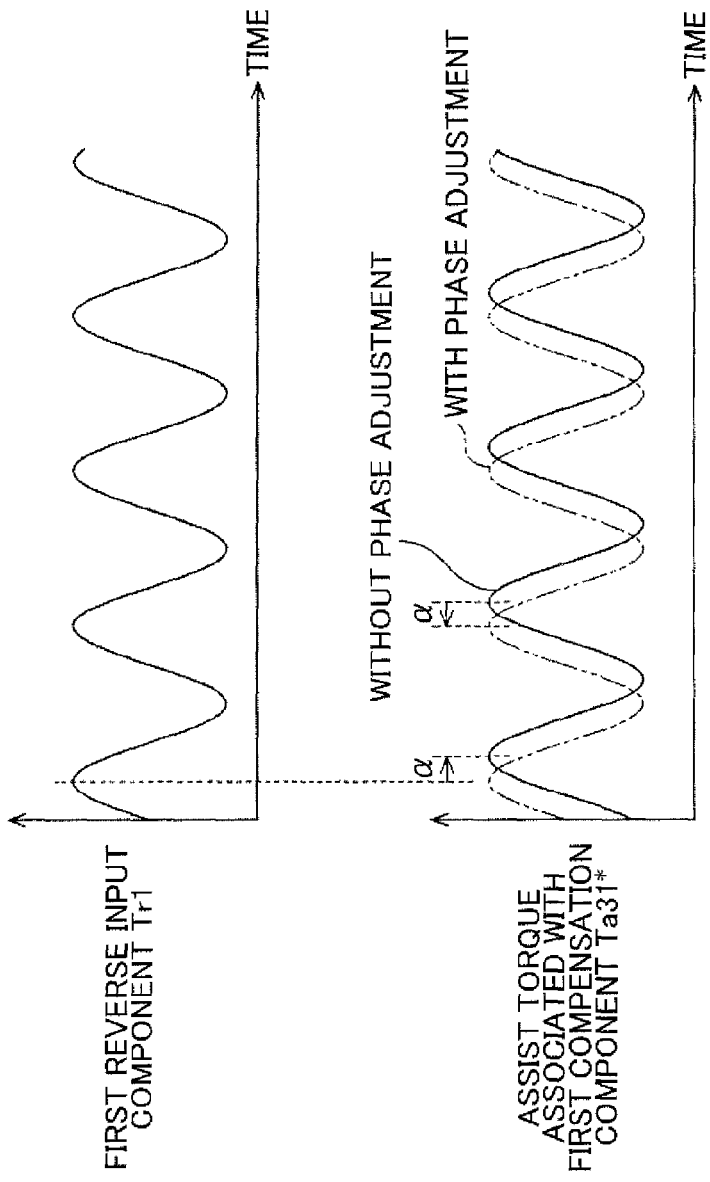
FIG. 6A and FIG. 6B are graphs showing a waveform of a first reverse input component Tr1 and a waveform of assist torque associated with a first compensation component Ta31* for comparison.

FIG. 6A and FIG. 6B show, with continuous lines, a waveform of the actual first reverse input component Tr1 at a part where the assist torque from the motor 30 is applied to the steering mechanism 2 and a waveform of the assist torque associated with the first compensation component Ta31*, respectively, when the first specific frequency component Te1 is directly used as the first compensation Ta31*. As shown in FIG. 6A and FIG. 6B, there is a phase shift a between the first reverse input component Tr1 and the assist torque associated with the first compensation component Ta31*. This is because the assist torque associated with the first compensation component Ta31* is delayed with respect to the first reverse input component Tr1 due to, for example, the configuration of the speed reducer 31 that transmits the assist torque from the motor 30 to the column shaft 21a or delay of calculation of the microcomputer 51. Such phase shift causes road information to be transmitted to the driver less precisely.

The phase adjustment unit 81b adjusts the phase of the first specific frequency component Te1 such that the degree of the phase shift between the first reverse input component Tr1 and the assist torque associated with the first compensation component Ta31* is 0°. In the first embodiment, the degree of the phase shift between the first reverse input component Tr1 transmitted to the lower end of the column shaft 21a and the assist torque associated with the first compensation component Ta31* is preliminarily measured by experiments or other means. When the obtained measurement result shows that the assist torque associated with the first compensation component Ta31* is delayed with respect to the first reverse input component Tr1 by α as indicated by the solid lines in FIG. 6A and FIG. 6B, the phase adjustment unit 81b advances the phase of the first specific frequency component Te1 by α. In this manner, as indicated by long dashed double-short dashed lines in FIG. 6B, the phase of the assist torque associated with the first compensation component Ta31* can be advanced by α, so that the degree of the phase shift between the actual first reverse input component Tr1 and the assist torque associated with the first compensation component Ta31* can be set to approximately 0°. As shown in FIG. 5, the phase adjustment unit 81b outputs the phase-adjusted first specific frequency component Te1' to a map calculation unit 81c.

The map calculation unit 81c has a map that indicates the relation between the phase-adjusted first specific frequency component Te1' and the first compensation component Ta31\*, and uses this map to calculate the first compensation component Ta31\* from the first specific frequency component Te1'. The map of the map calculation unit 81c is configured such that the value of the first compensation component Ta31\*, for example, increases as the absolute value of the first specific frequency component Te1' increases. The map calculation unit 81c outputs the calculated first compensation component Ta31\* to the adder 83.

The second calculation unit 82 includes a filter unit 82a and a phase adjustment unit 82b.

The filter unit 82a extracts, from the reverse input estimation value Te, a second specific frequency component Te2 belonging to a frequency band associated with the second reverse input component Tr2 that causes poor steering feel. For the frequency band associated with the second reverse input component Tr2 that causes poor steering feel, a frequency band associated with, for example, the braking vibrations is employed. In the first embodiment, frequency bands of the reverse input vibrations associated with the braking vibrations is assumed to be measured experimentally and the measurement results are used to set the frequency band associated with the second reverse input component Tr2 that causes poor steering feel. The filter unit 82a outputs the extracted second specific frequency component Te2 to the phase adjustment unit 82b.

Figure 7:
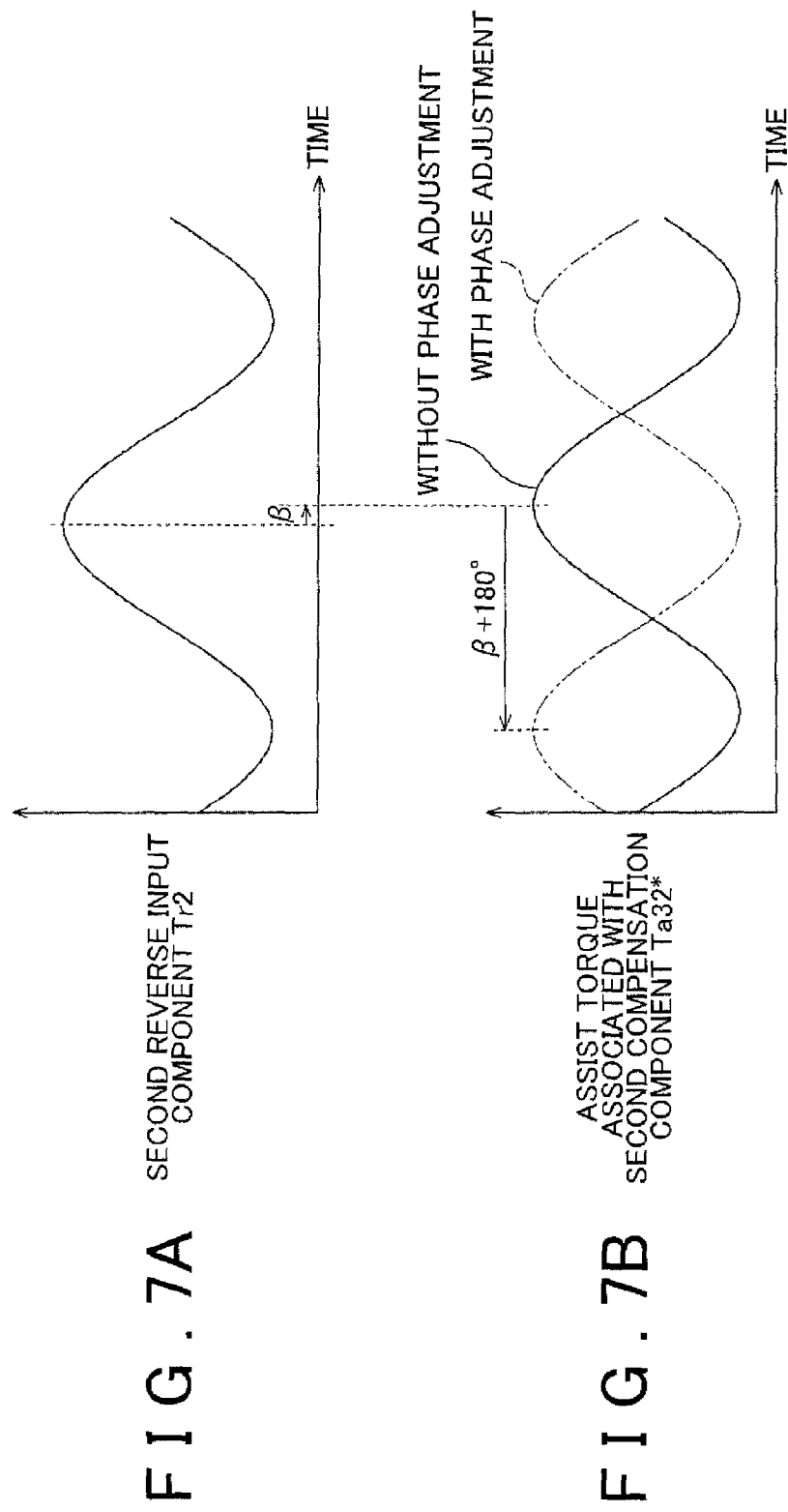
FIG. 7A and FIG. 7B are graphs showing a waveform of a second reverse input component Tr2 and a waveform of assist torque associated with a second compensation component Ta32* for comparison.

The phase adjustment unit 82b adjusts the phase of the second reverse input component Tr2 such that the degree of the phase shift between the second reverse input component Tr2 at the lower end of the column shaft 21a and the assist torque associated with the second compensation component Ta32\* is approximately 180°. When the obtained measurement result shows that the assist torque associated with the second compensation component Ta32\* is delayed with respect to the second reverse input component Tr2 by β as shown in FIG. 7A and FIG. 7B, the phase adjustment unit 82b advances the phase of the second specific frequency component Te2 by +180°. In this manner, as indicated by long dashed double-short dashed lines in FIG. 7B, the phase of the assist torque associated with the second compensation component Ta32\* can be advanced by β+180°, so that the degree of the phase shift between the actual second reverse input component Tr2 and the assist torque associated with the second compensation component Ta32\* can be set to approximately 180°. As shown in FIG. 5, the phase adjustment unit 82b outputs the phase-adjusted second specific frequency component Te2 to the adder 83 as the second compensation component Ta32\*.

The above electric power steering device 1 according to the first embodiment has the following actions and positive effects.

(1) In the first embodiment, the compensation component Ta3\* includes the first compensation component Ta31\* and the second compensation component Ta32\*. The assist torque associated with the first compensation component Ta31\* and the assist torque associated with the second compensation component Ta32\* are applied to the steering mechanism 2.

While the vehicle is traveling, the reverse input transmitted from the steered wheels 4 to the steering mechanism 2 includes the first reverse input component Tr1 reflecting a road condition. In this case, the first calculation unit 81 extracts the first specific frequency component Te1 from the reverse input estimation value Te through the filter unit 81a, and sets the first compensation component Ta31\* based on the extracted first specific frequency component Te1. The assist torque associated with the first reverse input component Tr1, that is, the assist torque associated with a road condition is thus applied to the steering mechanism 2. In this manner, the driver can obtain road information associated with a road condition through the change of the assist torque transmitted to the steering wheel 20.

(2) The first calculation unit 81 adjusts the phase of the first specific frequency component Te1 with the phase adjustment unit 81b, thereby setting the degree of the phase shift between the first reverse input component Tr1 at the lower end of the column shaft 21a and the assist torque associated with the first compensation component Ta31\* to approximately 0° as shown in FIG. 6A and FIG. 6B. In this manner, the assist torque associated with the first compensation component Ta31\* can act more correctly in the same direction as the reverse input vibrations reflecting a road condition, so that the reverse input vibrations associated with a road condition can be amplified more precisely. Accordingly, the driver can obtain road information more precisely.

(3) The first calculation unit 81 uses the map calculation unit 81c to set the absolute value of the first compensation component Ta31\* larger as the absolute value of the first specific frequency component Te1 becomes larger. Accordingly, when the vehicle is traveling on a road surface where the absolute value of the first reverse input component Tr1 changes greatly, such as a bumpy road surface like a gravel road, the assist torque of the motor 30 changes more greatly. This allows the driver to grasp road information more sensitively, and it is thus possible to further improve the steering feel that the driver receives.

(4) For example, when vibrations that cause poor steering feel, such as the braking vibrations, are produced in the steering mechanism 2, the reverse input includes the second reverse input component Tr2 that causes poor steering feel. In this case, the second calculation unit 82 extracts the second specific frequency component Te2 associated with the braking vibrations or other vibrations from the reverse input estimation value Te through the filter unit 82a. The second calculation unit 82 also adjusts the phase of the second specific frequency component Te2 with the phase adjustment unit 82b, thereby setting the degree of the phase shift between the second reverse input component Tr2 at the lower end of the column shaft 21a and the assist torque associated with the second compensation component Ta32\* to approximately 180° as shown in FIG. 7A and FIG. 7B. This allows the assist torque associated with the second compensation component Ta32\* to reliably act in the opposite direction to the reverse input vibrations that causes poor steering feel, so that the reverse input vibrations that cause poor steering feel can be suppressed more precisely. It is thus possible to further improve the steering feel that the driver receives.

The following describes a second embodiment of the electric power steering device 1 mainly focusing on the differences from the first embodiment.

Figure 8:
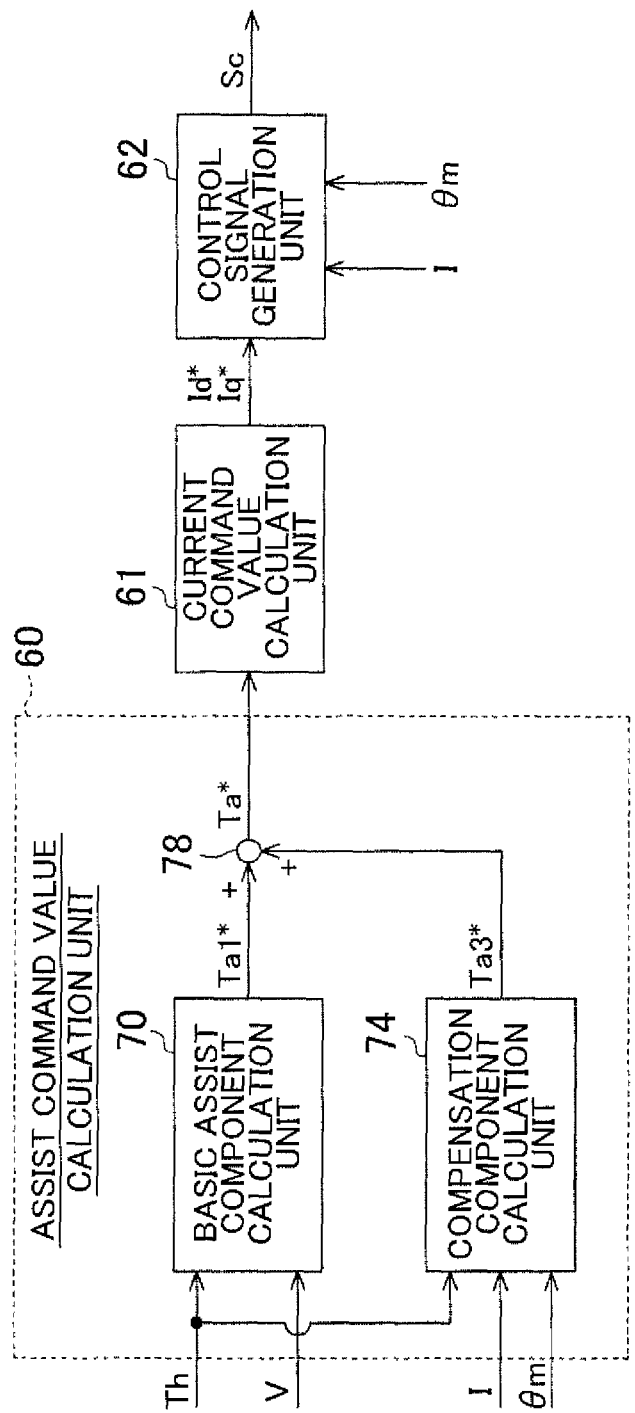
FIG. 8 is a control block diagram of a control device of an electric power steering device according to a second embodiment.

As shown in FIG. 8, the control device 5 in the second embodiment differs from that in the first embodiment in that steered angle feedback control is not performed. That is, in the assist command value calculation unit 60 in the second embodiment, an adder 78 receives the assist component Ta1\* calculated by the basic assist component calculation unit 70 and the compensation component Ta3\*calculated by the compensation component calculation unit 74. The adder 78 adds up the assist component Ta1* and the compensation component Ta3* to calculate the assist command value Ta* (=Ta1*+Ta3*).

The above electric power steering device 1 according to the second embodiment has the following actions and positive effects.

(5) In the electric power steering device 1 according to the second embodiment, the assist command value Ta* includes the compensation component Ta3*, and the assist torque associated with the compensation component Ta3* is applied to the steering mechanism 2. That is, the steering mechanism 2 receives the assist torque associated with the first compensation component Ta31* and the assist torque associated with the second compensation component Ta32*. Therefore the electric power steering device 1 in the second embodiment has the same actions and effects as those in the first embodiment except actions and effects based on the steered angle feedback control.

Each of the embodiments described above can be implemented with the following configurations.

In the first embodiment, the assist command value Ta* is changed by adding the compensation component Ta3* to the basic drive torque Tc that is input information of the steered angle command value calculation unit 75. Alternatively, the assist command value Ta* may be changed, for example, by correcting the second assist component Ta2* output from the steered angle feedback control unit 76 based on the compensation component Ta3*. That is, any configuration that changes the assist command value Ta* based on the compensation component Ta3* is acceptable.

The steered angle command calculation unit 75 in the first embodiment is not limited to configurations calculating the steered angle command value θt* based on the ideal model. For example, the steered angle command calculation unit 75 may calculate the steered angle command value θt* by map operation.

For example, an appropriate parameter that can be converted to the steered angle θt, such as the rotation angle of the steering shaft 21 may be employed in the steered angle feedback control in the first embodiment.

In the phase adjustment unit 81b in each embodiment, the phase of the first specific frequency component Te1 is adjusted such that the degree of the phase shift between the first reverse input component Tr1 at the lower end of the column shaft 21a and the assist torque associated with the first compensation component Ta31* to 0°. However, the adjustment amount of the phase of the first specific frequency component Te1 in the phase adjustment unit 81b may be changed as appropriate. Likewise, in the phase adjustment unit 82b, the adjustment amount of the phase of the second frequency component Te2 may be changed as appropriate.

In each embodiment, the first specific frequency component Te1 belonging to the frequency band associated with the first reverse input component Tr1 reflecting a road condition and the second specific frequency component Te2 belonging to the frequency band associated with the second reverse input component Tr2 that causes poor steering feel are employed as the specific frequency components extracted from the reverse input estimation value Te. However, the specific frequency components extracted from the reverse input estimation value Te may be changed desirably.

Although in each embodiment, the map calculation unit 81c uses a map that is configured such that the value of the first compensation component Ta31* increases as the absolute value of the first specific frequency component Te1' increases, this map may be changed as appropriate. For example, it is acceptable to use a map configured such that the value of the first compensation component Ta31* increases as the absolute value of the first specific frequency component Te1' increases when the first specific frequency component Te1 is less than a specified threshold value, and the first compensation component Ta31* is set to a fixed value when the first specific frequency component Te1 is equal to or more than the specified threshold value. In this manner, changing the map used by the map calculation unit 81c as appropriate allows the assist torque associated with the first compensation component Ta31* to be changed desirably. That is, reverse input vibrations reflecting a road condition can be adjusted desirably, whereby the steering feel is further improved.

Although in each embodiment, the first calculation unit 81 is provided with the map calculation unit 81c, the map calculation unit 81c may be omitted. That is, the first specific frequency component Te1' having the phase adjusted by the phase adjustment unit 81b may be used directly as the first compensation component Ta31*. Alternatively, the product of the phase-adjusted first specific frequency component Te1' and a predetermined gain may be used as the first compensation component Ta31*.

The second calculation unit 82 in each embodiment may be provided with a map calculation unit that calculates the second compensation component Ta32* based on a map indicating the relation between the phase-adjusted second specific frequency component Te2 and the second compensation component Ta32*. In this manner, the magnitude of the assist torque associated with the second compensation component Ta32* can be changed desirably through map operation. That is, it is possible to desirably adjust the degree of suppression of the reverse input vibrations that cause poor steering feel, whereby the steering feel that the driver receives is further improved.

The compensation component calculation unit 74 in each embodiment is provided with both the first calculation unit 81 that calculates the first compensation component Ta31* and the second calculation unit 82 that calculates the second compensation component Ta32*, but may be provided with either of the two units. For example, when the compensation component calculation 74 is only provided with the first calculation unit 81, the first compensation component Ta31* calculated by the first calculation unit 81 may be used directly as the compensation component Ta3*. Likewise, when the compensation component calculation unit 74 is only provided with the second calculation unit 82, the second compensation component Ta32* calculated by the second calculation unit 82 may be used directly as the compensation component Ta3*.

In each embodiment, the reverse input estimation value Te is calculated with formula (2), but the calculation method for the reverse input estimation value Te may be changed as appropriate.

In each embodiment, the reverse input estimation value Te is calculated based on the steering torque Th, each of the phase current values I and the motor rotation angle θm, but the reverse input may be detected by a sensor. The reverse input transmitted from the steered wheels 4 to the steering mechanism 2 is correlated with force acting in the axial direction of the rack shaft 23 (axial force). As indicated by dashed lines in FIG. 1 and FIG. 2, an axial force sensor 9 may be provided to detect the axial force Fa acting in the axial direction of the rack shaft 23. The reverse input detection value may thus be calculated based on the detected axial force Fa from the axial force sensor 9.

In each embodiment, the steered angle θt is detected using the rotation angle senor 8 and the steered angle calculation unit 77, but a detection unit that detects the steered angle θt is not limited to this configuration. For example, it is acceptable to use a steered angle sensor that detect a steering-shaft angle serving as the rotation angle of the steering shaft 21 or sensors capable of directly detecting the steered angle θt.

In each embodiment, the basic assist component calculation unit 70 sets the first assist component Ta1* based on the steering torque Th and the vehicle speed V. The first assist component Ta1*, however, may be set based on, for example, the steering torque Th only. It is acceptable to perform what is called phase compensation control that changes the phase of the steering toque Th detected by the torque sensor 6 based on the change rate of the first assist component Ta1* relative to the steering torque Th. It is acceptable to further perform various types of compensation control that compensate the first assist component Ta1*. In this case, effects of the various types of compensation control can be obtained by using a value, as the basic drive torque Tc, obtained by adding a compensation value calculated by the various types of compensation control to the addition value of the steering torque Th and the first assist component Ta1*.

The electric power steering device 1 according to each embodiment can be applicable not only to an electric power steering device in which assist torque from the motor 30 is applied to the column shaft 21a, but also, for example, to an electric power steering device in which assist force is applied to the rack shaft 23. In the latter case, since a part to which the assist force from the motor in the steering mechanism 2 is applied is in the rack shaft 23, the phase adjustment unit 81b needs to adjust the phase of the first compensation component Ta31* based on the degree of the phase shift between the first reverse input component Tr1 at the part in the rack shaft 23 to which the assist force from the motor 30 is applied and the assist force associated with the first compensation component Ta31*. The phase adjustment unit 82b needs to adjust the phase of the second compensation component Ta32* based on the degree of the phase shift between the second reverse input component Tr2 at the part in the rack shaft 23 to which the assist force from the motor is applied and the assist force associated with the second compensation component Ta32*.

What is claimed is:

1. An electric power steering device comprising:
an assist mechanism that applies assist force from a motor to a steering mechanism of a vehicle; and
a control device, which includes a microcomputer, that controls drive of the motor based on an assist command value associated with a target value for the assist force, wherein
the control device includes:
a basic assist component calculator that calculates a first assist component serving as a basic component for the assist force based on steering torque applied by the steering mechanism in response to steering operation of the vehicle;
a compensation component calculator that calculates a compensation component associated with a reverse input acting on the steering mechanism from steered wheels of the vehicle; and
an assist command value calculator that calculates the assist command value by compensating the first assist component based on the compensation component, wherein:
the compensation component calculator includes:
a reverse input detection portion that detects or estimates the reverse input;
a filter that extracts a specific frequency component belonging to a certain frequency band from the detected or estimated reverse input; and
a phase adjustment portion that adjusts the phase of the specific frequency component extracted by the filter, wherein
the compensation component calculator calculates the compensation component based on the phase-adjusted specific frequency component.

2. An electric power steering device according to claim 1, wherein:
the control device further includes:
a steered angle command value calculator that calculates a steered angle command value associated with a target value for a steered angle of steered wheels of the vehicle based on the steering torque; and
a steered angle feedback control calculator that calculates a second assist component by performing steered angle feedback control that causes the steered angle of the steered wheels to follow the steered angle command value, and
the assist command value calculator is configured to calculate the assist command value based on an addition value of the first assist component and the second assist component, and change the assist command value based on the compensation component.

3. The electric power steering device according to claim 1, wherein:
the certain frequency band is a frequency band associated with a first reverse input component included in the reverse input and reflecting a road condition, and
the phase adjustment portion is configured to adjust the phase of the specific frequency component such that the degree of a phase shift between the first reverse input component in the steering mechanism and the assist force associated with the compensation component is 0°.

4. The electric power steering device according to claim 1, wherein:
the certain frequency band is a frequency band associated with a second reverse component included in the reverse input and causing poor steering feel, and
the phase adjustment portion is configured to adjust the phase of the specific frequency component such that the degree of a phase shift between the second reverse input component in the steering mechanism and the assist force associated with the compensation component is 180°.

5. The electric power steering device according to claim 1, wherein:
the compensation component calculator further includes a map calculator that calculates the compensation component from the phase-adjusted specific frequency component based on a map indicating a relation between the phase-adjusted specific frequency component and the compensation component.

6. The electric power steering device according to claim 2, wherein
the certain frequency band is a frequency band associated with a first reverse input component included in the reverse input and reflecting a road condition, and
the phase adjustment portion is configured to adjust the phase of the specific frequency component such that the degree of a phase shift between the first reverse input component in the steering mechanism and the assist force associated with the compensation component is 0°.

7. The electric power steering device according to claim 2, wherein
the certain frequency band is a frequency band associated with a second reverse component included in the reverse input and causing poor steering feel, and
the phase adjustment portion is configured to adjust the phase of the specific frequency component such that the degree of a phase shift between the second reverse input component in the steering mechanism and the assist force associated with the compensation component is 180°.

8. The electric power steering device according to claim 2, wherein
the compensation component calculator further includes a map calculator that calculates the compensation component from the phase-adjusted specific frequency component based on a map indicating a relation between the phase-adjusted specific frequency component and the compensation component.

9. The electric power steering device according to claim 1, wherein:
the phase adjustment portion is configured to adjust the phase of a first specific frequency component to a first predetermined degree, and is configured to adjust the phase of a second specific frequency component to a second predetermined degree.

* * * * *